Patented Sept. 8, 1942

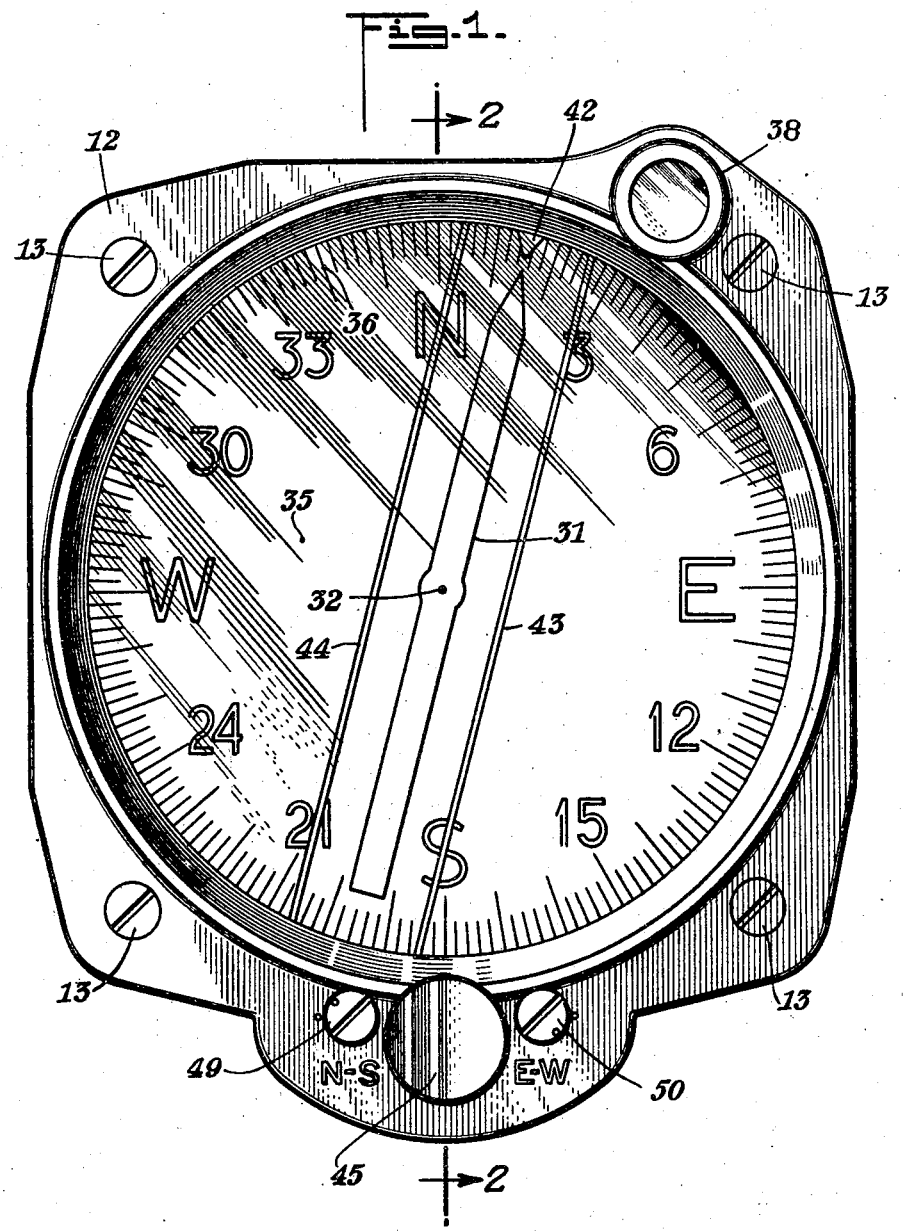

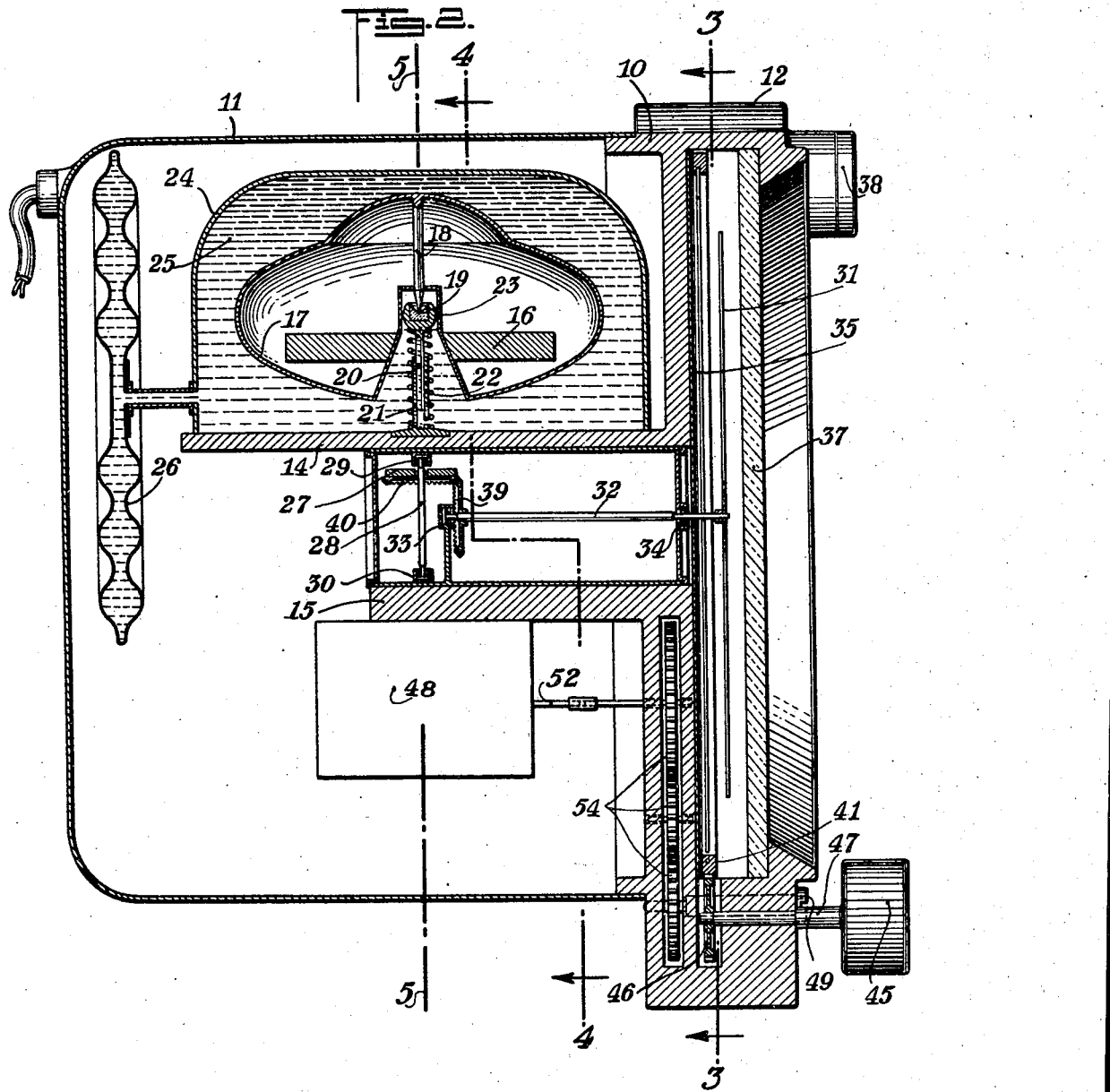

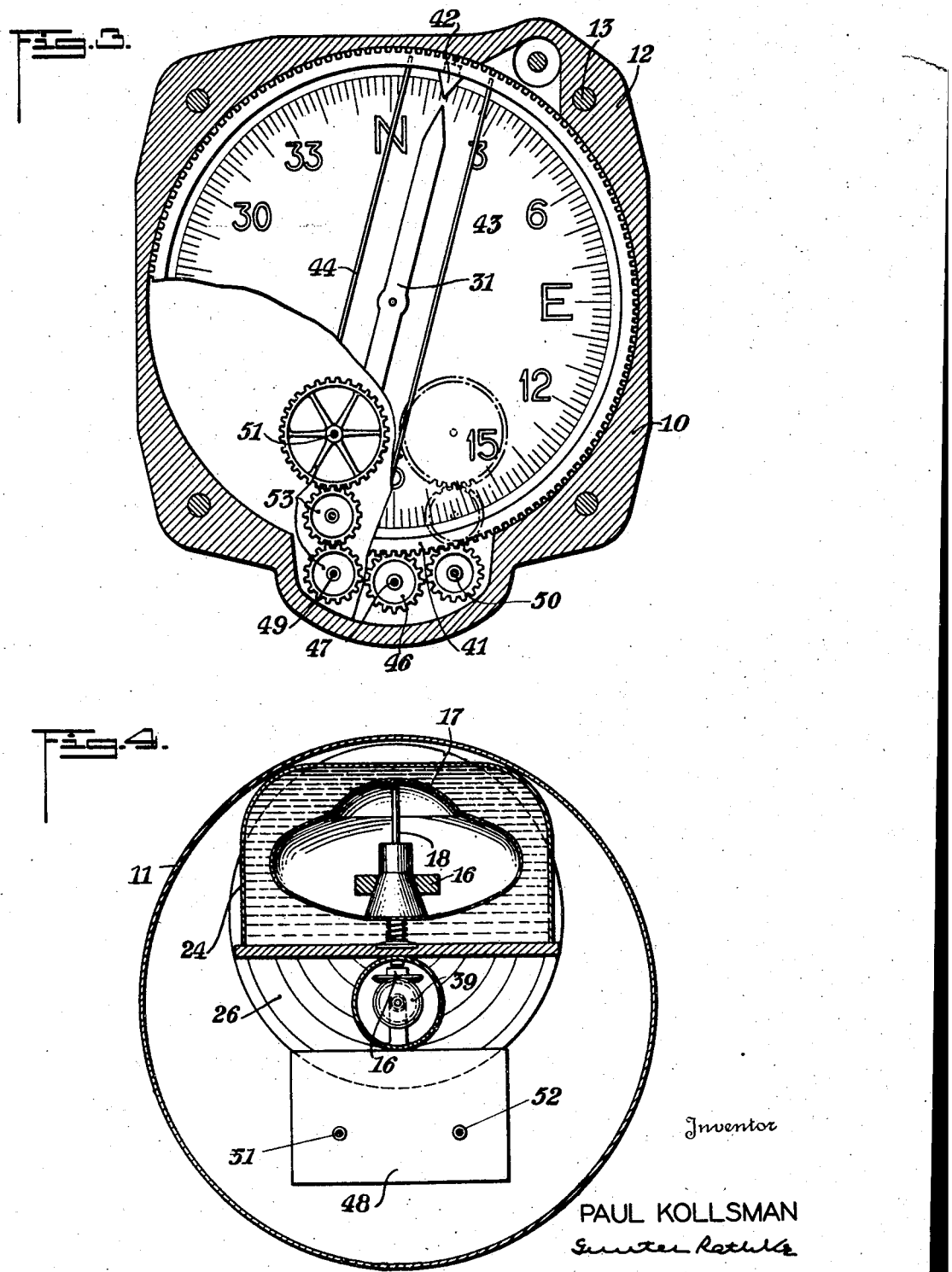

2,294,990

UNITED STATES PATENT OFFICE 2,294,990

DIRECTIONAL INSTRUMENT

Paul Kollsman, New York, N. Y., assignor, by mesne assignments, to Square D Company, Detroit, Mich., a corporation of Michigan Division and continuation of application July 7, 1938, Serial No. 217,904. This application February 17, 1940, Serial No. 319,390

6 Claims. (Cl. 33—223)

This invention relates to improvements in directional instruments, more particularly to directional instruments for determining the direction of travel of movable craft.

This application is a division and continuation of my co-pending application Serial No. 217,904 filed July 7, 1938, the latter application being a continuation in part of an earlier application Serial No. 168,905 filed October 14, 1937.

Among other objects this invention aims to provide an improved directional instrument, more particularly a magnetic compass, having a substantially vertical dial and being so constructed as to permit mounting of the instrument on an instrument panel or other fixed part of an airplane or speedboat with the dial in a fixed substantially vertical position without the necessity of employing the conventional gimbal mounting commonly used for suspending compasses. It is an object of this invention, accordingly, to provide an improved directional instrument which can be rigidly mounted on a fixed part of the craft in a similar manner as other control instruments, such as pressure gages, speedometers, temperature indicators, and the like.

It is a further object of this invention to provide a magnetic compass which will not be affected by oscillatory vibrations which would normally cause an error of several degrees in the indication.

It has been found by experiment that the instrument panel of an airplane is subject to vibrations which occur in a plane inclined approximately 45° with respect to the horizontal plane. These vibrations are of a circular nature and are generally reproduced for experimental and test purposes by securing a vertical test panel to a frame inclined 45° with respect to the horizontal axis and by vibrating the said frame by means of a small eccentric.

The vibrations imparted to the test panel may be divided into a horizontal and a vertical component.

The horizontal component causes the test panel to make minute oscillatory movements about a substantially horizontal axis and exerts a torque on all horizontal shafts movably mounted in an instrument secured to the panel. The shafts will, in response to the said torque, tend slowly to move in a clockwise direction.

In a similar manner the vertical component causes the instrument panel to make minute oscillations about a substantially vertical axis again affecting all horizontal shafts movably mounted on the instrument secured to the panel which tend to rotate in a clockwise direction.

The influence of the aforesaid vibrations on a compass mounted on the instrument panel is as follows:

If the directional magnet of the compass is aligned with the direction of the horizontal component of the earth's magnetic field, the torque exerted by the earth's magnetic field on the directional magnet is zero.

If the compass is now subjected to oscillatory vibrations about a substantially vertical axis, a small torque is exerted on the directional magnet causing the magnet to deviate from its correct position into a position in which the torque created by the vibrations and the torque exerted by the earth's magnetic field are equal. The deviation thus caused may amount to several degrees.

If the compass is equipped with an indicating means magnetically coupled with the directional magnet through a magnetic follower element, a further error is introduced.

In a position in which the magnetic follower element is in perfect alignment with the directional magnet, no torque is exerted between the two movable magnetic systems. If, however, a torque is exerted on the vertical shaft to which the follower element is secured, the follower element will deviate from the position of the directional magnet into a position in which the torque existing between the directional magnet and the follower element is equal to the torque caused by the vibrations and acting on the said vertical shaft. This error may again amount to several degrees and is added to the aforementioned error in the position of the directional magnet.

It is an object of this invention to eliminate such errors which are due to oscillatory vibrations acting on the instrument. According to the present invention, I provide in a compass having a compass casing adapted to be fixedly mounted on an instrument panel a vertical shaft rotated by the directional magnet and a horizontal shaft to operate the indicating means, the two shafts being so connected that the torque exerted upon the one shaft is opposed to the torque exerted upon the other.

Further aims, objects and advantages of this invention will appear from a consideration of the description which follows with the accompanying drawings, showing for purely illustrative purposes an embodiment of this invention. It is to be understood, however, that the description is not to be taken in a limiting sense, the scope of this invention being defined in the appended claims.

Referring to the drawings:

Fig. 1 is a front elevation of an improved compass according to this invention;

Fig. 2 is a sectional side elevation of the instrument shown in Fig. 1, a section being taken on line 2—2;

Fig. 3 is a sectional front elevation on a reduced scale, a section being taken on line 3—3 of Fig. 2; and Fig. 4 is a sectional front elevation of the instrument shown in Fig. 2, a section being taken on line 4—4.

An instrument casing is shown in the illustrated embodiment as consisting of a front part 10 and a rear part 11, the front part being provided with a flange 12 for fixedly mounting the instrument on an instrument panel in a conventional manner, mounting screws 13 being shown for this purpose. The instrument thus partakes of all movements of the craft about the three principal axes, a vertical or azimuth axis, a longitudinal, and a lateral axis.

The front part 10 is provided with extensions 14 and 15 serving as a support for the direction responsive element.

In the form of the invention, shown in the drawings and illustrating a magnetic compass, the direction responsive element comprises a first or directional magnetic element 16 mounted within a float 17, the float being provided with a pivot 18 resting in a cup-shaped jewel bearing 19. The jewel bearing is mounted in an upper receptacle of a supporting stem 20 slidable in a sleeve 21 and mounted on the supporting bracket 14. A helical spring 22, bearing against the receptacle of the stem 20, resiliently supports the float thus preventing possible damage to the delicate jewel bearing in cases of shock exerted on the instrument. The directional element is thus supported for freedom to turn about as well as tilt relatively to the vertical or azimuth axis 5—5.

A tubular extension 23, extending into the float 17 and fitting loosely around the cup-shaped receptacle for the jewel bearing 19, prevents a disengagement of the pivot and jewel in cases where the instrument is turned upside down.

A liquid-tight chamber 24, containing a fluid 25, encloses the float 17, the fluid thus buoyantly supporting the float with the magnetic element, thereby reducing the weight of the magnetic element 16 exerted on the jewel bearing.

A conventional expansion chamber, shown in the illustrated embodiment as being a diaphragm box 26, may be provided to compensate for expansion and contraction of the fluid in response to changes in temperature.

For the purpose of deriving a directional impulse from the fluid-enclosed directional element for actuating indicating means a positional pick-off is provided.

In the illustrated embodiment the positional pick-off comprises a second magnetic or follower element 27 mounted on a substantially vertical shaft 28, the shaft being rotatable in bearings 29 and 30, supporting the follower magnet 27 for freedom to turn about the azimuth axis 5—5.

The indicating means of the illustrated form of instrument include a pointer 31 supported on a substantially horizontal shaft 32 rotatable in bearings 33 and 34 for rotary movement relatively to a normally fixed dial 35, provided with a directional graduation 36. The pointer and dial are visible through a front window 37 of the instrument casing, the front window of the illustrated instrument being also used for illuminating the dial by means of an electric bulb enclosed in a compartment 38 as disclosed more specifically in my Patent #2,088,559, dated July 27, 1937.

A bevel gear 39 is secured to the shaft 32 meshing with a second bevel gear 40 on the vertical shaft 28.

The operation of the instrument so far described is as follows:

The directional magnetic element, supported for free movement in azimuth, will align itself with the direction of the earth's magnetic field by virtue of its confinement by the same. The pivotal support of the directional element permits the element to maintain a horizontal position irrespective of tilting movements of the craft or the instrument casing. The second magnetic or follower element 27 being of much smaller magnetic force than the directional element 16, is maintained in magnetic confinement by the same and tends to align itself with the directional element, thus repeating the movements of the latter in azimuth. The movements of the follower element 27 are transmitted to the indicating means which thus give an indication of the magnetic north south direction with respect to the direction of travel of the craft on which the instrument is mounted.

It may now be assumed that oscillatory vibrations act on the instrument in a plane inclined 45° with respect to the horizontal plane and that such vibrations are in a clockwise direction with respect to an observer facing the instrument. The horizontal component will exert a torque on the horizontal shaft 32 tending to rotate the shaft in a clockwise direction.

In a similar manner the vertical component affects the vertical shaft 28 tending to rotate the shaft in a clockwise direction if viewed from the top of the instrument. Due to the gear connection between the shafts 32 and 28, in the illustrated embodiment the bevel gear train 39 and 40, the torques exerted on the shafts 32 and 28 act in opposite directions thus tending to cancel out.

Thus the arrangement of a horizontal and a vertical shaft connected by a gear train is an effective means of compensating for torques exerted on each of the shafts due to oscillatory vibrations acting on the instrument.

In the illustrated embodiment in which the directional magnet 16 is supported by a pivot 18 resting in a jewel bearing, the torque exerted on the directional magnet is of a smaller order than the torque exerted on shafts 28 and 32. This is due to the fact that there is practically no play between the pivot 18 and the jewel bearing 19 while play in bearings 29 and 30 and 33 and 34 cannot be eliminated.

In order to permit steering of a predetermined course without the necessity of reading the pointer 31 against the graduation on the dial, a reference member is provided cooperating with the pointer as well as the dial.

In the illustrated form of the invention an externally toothed ring 41 is rotatably supported within the front part 10 of the instrument casing. The ring 41 bears a reference mark 42 normally cooperating with the pointer and bearing one or several reference lines suitably formed by wires 43 and 44 extending across the face of the dial. The ring 41 is adjustable coaxially with respect to the pointer by means of a knob 45 turning a gear 46 by means of a shaft 47, the gear meshing with the teeth of the ring 41.

The usual magnetic compensator, shown in the illustrated embodiment as enclosed within a box 48, may be provided to compensate the directional element against local sources of magnetic disturbance. The magnetic compensator 48 may be of any conventional form and is shown in the drawings as being adjustable from the outside by means of screw-headed shafts 49 and 50 actuating adjustment shafts 51 and 52 over gear trains 53 and 54.

Obviously the present invention is not restricted to the particular embodiments herein shown and described.

What is claimed is:

1. A compass comprising, in combination, an instrument casing having a front window surrounded by a mounting flange for fixed mounting on an instrument panel; a directional magnet mounted in said casing for movement in azimuth; a first substantially vertical shaft mounted in said casing coaxial with said directional magnet and coupled with said directional magnet; a second substantially horizontal shaft; a gear train connecting said first and second shaft so that error torques set up by oscillatory vibrations about one shaft tend to oppose the error torques about the other shaft; a substantially vertical dial in said casing visible through said window; and a pointer carried by said second shaft and movable relatively to said dial, whereby errors caused by oscillatory vibrations acting on the fixedly mounted instrument will be eliminated.

2. A compass comprising, in combination, an instrument casing having a front window surrounded by a mounting flange for fixed mounting on an instrument panel; a directional magnet mounted in said casing for movement in azimuth; a first substantially vertical shaft mounted in said casing coaxial with said directional magnet and coupled with said directional magnet; a second substantially horizontal shaft; a gear train connecting said first and second shaft so that error torques set up by oscillatory vibrations about one shaft tend to oppose the error torques about the other shaft; and indicating means actuated by said second shaft, said indicating means including a substantially vertical dial visible through said window, whereby errors caused by oscillatory vibrations acting on the fixedly mounted instrument will be eliminated.

3. A compass comprising, in combination, an instrument casing having a front window surrounded by a mounting flange for fixed mounting on an instrument panel; a directional magnet mounted in said casing for movement in azimuth and freedom to tilt relatively to a substantially vertical axis; a first substantially vertical shaft mounted in said casing coaxial with said directional magnet; a magnetic follower element magnetically coupled with said directional magnet and connected to said first shaft; a second substantially horizontal shaft; a gear train connecting said first and second shaft so that error torques set up by oscillatory vibrations about one shaft tend to oppose the error torques about the other shaft; and indicating means actuated by said second shaft, said indicating means including a substantially vertical dial visible through said window, whereby errors caused by oscillatory vibrations acting on the fixedly mounted instrument will be eliminated.

4. A compass comprising, in combination, an instrument housing enclosing a substantially vertical dial, and a mounting flange surrounding said dial, said flange having provisions for fixed mounting, said housing being adapted to be fixedly mounted on an instrument panel; a compass bowl mounted in back of said dial; a directional magnet mounted in said bowl with freedom to turn abount and tilt relatively to a substantially vertical axis; a charge of liquid in said bowl; a substantially vertical first shaft mounted in said housing outside said bowl coaxially with said directional magnet, said first shaft being magnetically coupled with said directional magnet; a substantially horizontal second shaft mounted in said housing; a train of bevel gears connecting said first and said second shaft so that error torques set up by oscillatory vibrations about one shaft tend to oppose the error torques about the other shaft; and indicating means including said dial and a pointer, said pointer being carried by said second shaft and the dial being visible through said window, whereby errors caused by oscillatory vibrations acting on the fixedly mounted instrument will be eliminated.

5. A compass comprising, in combination, an instrument casing having means for fixedly mounting the instrument casing to an instrument panel; a directional magnet mounted in said casing for movement in azimuth; a substantially vertical first shaft mounted in said casing and coupled with said directional magnet; indicating means including a substantially vertical dial; a substantially horizontal second shaft connected to said indicating means; and means for so connecting said first and said second shaft that error torques about one of said shafts, set up by oscillatory vibrations acting in a plane inclined with respect to said dial, are opposed to the error torques about the other shaft, whereby errors due to oscillatory vibrations tend to cancel out.

6. A compass comprising, in combination, an instrument casing having means for fixedly mounting the instrument casing to an instrument panel; a directional magnet mounted in said casing for movement in azimuth; a substantially vertical first shaft mounted in said casing and coupled with said directional magnet; a first gear on said first shaft; indicating means including a substantially vertical dial; a substantially horizontal second shaft connected to said indicating means; a second gear on said second shaft meshing with said first gear and moving said first gear in a direction so that error torques about one of said shafts, set up by oscillatory vibrations acting in a plane inclined with respect to said dial, are opposed to the error torques about the other shaft, whereby errors due to oscillatory vibrations tend to cancel out.

PAUL KOLLSMAN.